(12) United States Patent
Tanei et al.

(10) Patent No.: US 6,997,156 B2
(45) Date of Patent: Feb. 14, 2006

(54) APPARATUS, METHOD, AND RECORDING MEDIUM FOR CONTROLLING STARTING OF AN INTERNAL COMBUSTION ENGINE

(75) Inventors: Katsutoshi Tanei, Aichi-ken (JP); Masae O-Hori, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/477,453

(22) PCT Filed: Jun. 7, 2002

(86) PCT No.: PCT/JP02/05662

§ 371 (c)(1),
(2), (4) Date: Nov. 12, 2003

(87) PCT Pub. No.: WO02/101231

PCT Pub. Date: Dec. 19, 2002

(65) Prior Publication Data

US 2004/0139938 A1    Jul. 22, 2004

(30) Foreign Application Priority Data

Jun. 8, 2001    (JP) ............................. 2001-174099

(51) Int. Cl.
*F02N 11/00* (2006.01)
(52) U.S. Cl. .................. 123/179.3; 290/38 B
(58) Field of Classification Search ............. 123/179.3, 123/179.4, 179.22; 290/38 B
See application file for complete search history.

(56) References Cited

U.S. PATENT DOCUMENTS

| | | | |
|---|---|---|---|
| 5,458,098 A | 10/1995 | Yagi et al. | |
| 6,250,270 B1 | 6/2001 | Ahner et al. | |
| 6,453,865 B1 | 9/2002 | Hirose et al. | |
| 6,581,559 B1 * | 6/2003 | Grob et al. | ............... 123/179.3 |
| 2002/0059019 A1 | 5/2002 | Nakao et al. | |

FOREIGN PATENT DOCUMENTS

| | | | |
|---|---|---|---|
| DE | 199 56 384 C1 * | 11/2000 | |
| JP | U 60-171961 | 11/1985 | |
| JP | A 3-3969 | 1/1991 | |
| JP | A 10-339185 | 12/1998 | |
| JP | A 11-147424 | 6/1999 | |
| JP | 2000-213440 A * | 8/2000 | |
| JP | A 2001-73911 | 3/2001 | |
| JP | A 2001-225674 | 8/2001 | |
| JP | A 2001-234837 | 8/2001 | |
| WO | WO 99/54620 | 10/1999 | |

* cited by examiner

*Primary Examiner*—Andrew M. Dolinar
(74) *Attorney, Agent, or Firm*—Oliff & Berridge, PLC

(57) ABSTRACT

An apparatus, method, and recording medium for controlling starting of an internal combustion engine. The apparatus for controlling starting of an internal combustion engine is provided with a clutch for connecting and disconnecting a motor and the internal combustion engine, which is installed in a vehicle. When starting the internal combustion engine, the clutch is released and the motor is maintained in an actuated state, and the clutch is engaged after the motor enters a predetermined rotation state.

28 Claims, 5 Drawing Sheets

Engine Stop Crank Angle

Coolant Temperature

APPARATUS, METHOD, AND RECORDING MEDIUM FOR CONTROLLING STARTING OF AN INTERNAL COMBUSTION ENGINE

TECHNICAL FIELD

The present invention relates to an apparatus, method, and recording medium for controlling starting of an internal combustion engine.

BACKGROUND ART

In vehicles provided with internal combustion engines, such as automobiles and the like, it has been proposed in recent years that the operation of the engine be automatically stopped when engine operation is not required, such as when, for example, the vehicle has no possibility of moving, to improve the fuel economy of the engine.

While the internal combustion engine of the vehicle is automatically stopped, various types of auxiliary devices, such as a water pump, a compressor, and an oil pump, are driven by a motor rather than being driven by the internal combustion engine. When auxiliary devices are driven by a motor while the internal combustion engine is automatically stopped in this way, it is desirable that the drive force of the motor be transmitted only to the auxiliary device and not transmitted to the engine. To achieve this goal, Japanese Laid-Open Patent Publication No. 10-339185, for example, proposes blocking power transmission between a motor and an internal combustion engine by means of a clutch when driving auxiliary devices with a motor.

When there is a demand to move the vehicle while the engine is automatically stopped, forced rotation of the internal combustion engine is required in order to start the engine. From the perspective of reducing the number of components of the vehicle, the forced rotation of the internal combustion engine for the purpose of starting the engine is also performed by the motor in the above publication. That is, when a start command is issued to the automatically stopped internal combustion engine, the motor is driven in a state in which the clutch connects the motor and the internal combustion engine to forcibly rotate the internal combustion engine.

Since it is desirable to lighten the weight of the vehicle in order to improve the fuel economy of the internal combustion engine, the aforesaid motor has been progressively made more compact, or with lower capacity. A decrease in the output of the motor is an unavoidable result of making the motor smaller, and if the motor is made too small, the motor will not be capable of forcibly rotating the internal combustion engine adequately to start the engine. Therefore, the compactness of the motor is limited by the need for the motor to provide sufficient forcible rotation of the internal combustion engine and properly start the engine.

In view of this fact, an object of the present invention is to provide a device for controlled starting of an internal combustion engine capable of allowing maximum compactness of the motor while providing sufficient forcible rotation of the internal combustion engine which is adequate to start the engine.

SUMMARY OF THE INVENTION

These objects are attained by an embodiment of the present invention which provides a device for controlled starting of an internal combustion engine having a clutch for connecting and disconnecting a motor and an internal combustion engine installed in a vehicle. This device is provided with a control means for releasing the clutch and maintaining the motor in an actuated state when starting the internal combustion engine, and engaging the clutch after the motor has attained a predetermined rotation state.

Accordingly, the clutch is held in the released state from the time the starting of the internal combustion engine begins until the motor attains a predetermined rotation state. Thus, the motor is driven separately from the internal combustion engine, and the rotational force of the motor is accumulated as inertia in the direction of rotation of the motor. Thereafter, when the motor attains the predetermined rotation state and the clutch is engaged, the inertial force is added to the rotational force and works on the internal combustion engine, such that the internal combustion engine is forcibly rotated by these two forces. In this way the forcible rotation of the internal combustion engine is accomplished by both the rotational force and the inertial force of the motor, such that the motor may be designed for maximum compactness while suitably executing forcible rotation to start the engine.

In this case, the predetermined rotation state of the motor is desirably a state of the minimum rotation required to obtain forcible rotation of the internal combustion engine suitable for starting the engine when the clutch is engaged. Furthermore, the motor rotation state may be, for example, the motor rotation speed. Whether or not the motor attains the predetermined rotation state can be determined, for example, by whether or not the motor rotation speed has attained a predetermined speed value corresponding to the predetermined rotation state, or by whether or not the time elapsed since the internal combustion engine start command was issued has reached a predetermined time corresponding to the predetermined rotation state.

The device for controlled starting of an internal combustion engine of another embodiment of the present invention provides a control means for releasing the clutch and maintaining a motor in an actuated state when starting the internal combustion engine, and engaging the clutch after a predetermined time has elapsed since an engine start command was issued.

According to this structure, since the clutch is maintained in a released state from the time of beginning to start the internal combustion engine until a predetermined time has elapsed, the motor is disconnected from the internal combustion engine while the motor is operating, such that the motor rotational force accumulates as an inertial force in the rotation direction. Thereafter, when the clutch is engaged after a predetermined time has elapsed since beginning to start the internal combustion engine, the inertial force is added to the rotational force of the motor and both act upon the internal combustion engine so as to forcibly rotate the internal combustion engine. In this way the rotational force and the inertial force of the motor are used to forcibly rotate the internal combustion engine, and this same forcible rotation is used to appropriately accomplish the starting of the engine, thus allowing the motor to be designed for maximum compactness.

The aforesaid predetermined time is desirably the time required to attain the minimum motor rotation state to obtain a forcible rotation of an internal combustion engine suitable for starting the engine when the clutch is engaged.

The motor also may be used to move the vehicle. In this instance, the motor used to start the internal combustion engine is also used as a motor for moving the vehicle so as to avoid increasing the number of parts used.

It is desirable that the previously mentioned control means changes the operating control of the motor in accordance with the engine state until the engagement of the clutch begins. The rotation state of the motor when the clutch, which is required to forcibly rotate the internal combustion engine in a manner suitable to start the engine, is in a released state will differ in accordance with the state of the engine at that time. If the operating control of the motor can be changed with the clutch in a released state in accordance with the state of the combustion engine, the state of the motor when it has attained a predetermined rotational state can be made suitable to forcibly rotate the internal combustion engine so as to start the engine.

It is desirable that the control means determines whether or not the motor has attained a predetermined rotation state, and changes the determination value used in this determination in accordance with the state of the engine. If the determination value used in the determination of whether or not the motor has attained a predetermined rotation state is changed in accordance with the state of the engine, the rotation state of the motor when it has been determined that the motor has attained a predetermined rotation state is a rotation state suitable for forcibly rotating the combustion engine so as to start the engine.

It is desirable that the control means determines whether or not a predetermined time has elapsed since the engine start command was issued, and changes the determination value used in this determination in accordance with the state of the engine. In this case, since the determination value, which is used to determine whether or not a predetermined time has elapsed since an engine start command was issued, changes in accordance with the state of the engine, the rotation state of the motor when it has been determined that the predetermined time has elapsed since the engine start command was issued is a rotation state suitable for forcibly rotating the combustion engine so as to start the engine.

It is desirable that the control means determines whether or not the starting of the internal combustion engine is completed after the clutch has been engaged, and restarts the engine when it is determined that the starting of the engine has not been completed. In this case, the internal combustion engine can be reliably started because the engine is restarted when the initial starting of the engine is not completed.

It is desirable that when the control means determines that the initial starting of the engine has not been completed, the engine is restarted in the same sequence as the initial starting of the engine after the clutch has been released. In this case, the starting of the internal combustion engine can be easily completed during engine restart because the rotational force of the motor has accumulated as an inertial force in the direction of rotation before restarting the engine.

It is desirable that when the control means determines that starting has not been completed by the initial engine starting, the clutch is released after reversely rotating the internal combustion engine a predetermined amount via the motor. In this case, even when the internal combustion engine has become locked without completed starting of the engine during the initial engine starting process, the engine lock is released by the reverse rotation of the motor so as to enable smooth restarting of the engine.

It is desirable that the control means reversely rotates the internal combustion engine via the motor until a state suitable for starting the engine is attained. In this case, since the internal combustion engine attains a state suited for starting the engine by means of the reverse rotation of the motor, there is an increased possibility of completing the starting of the engine when the engine is restarted.

Another embodiment of the present invention provides a method for controlled starting of an internal combustion engine provided with a clutch for connecting and disconnecting a motor and an internal combustion engine installed in a vehicle. This method includes releasing the clutch and maintaining a motor in an actuated state when starting the internal combustion engine, and engaging the clutch after the motor has attained a predetermined rotation state.

The method for controlled starting of an internal combustion engine of another embodiment of the present invention includes releasing the clutch and maintaining a motor in an actuated state when starting the internal combustion engine, and engaging the clutch after a predetermined time has elapsed since an engine start command was issued.

It is desirable that these methods for controlled starting include a sequence of execution by the control means in the device for controlled starting.

Still another embodiment of the present invention provides a computer-readable recording medium for recording a program on which is recorded a program for controlled starting of an internal combustion engine provided with a clutch for connecting and disconnecting a motor and an internal combustion engine installed in a vehicle. This program includes a process for releasing the clutch and maintaining a motor in an actuated state when starting the internal combustion engine, and engaging the clutch after the motor has attained a predetermined rotation state.

It is desirable that these programs include a sequence for executing a control means in the device for controlled starting.

DETAILED (First Embodiment)

A first embodiment of the present invention applied to an engine installed in a vehicle is described below with reference to FIGS. 1 through 4. The engine is automatically stopped and started in accordance with the movement state of the vehicle.

Figure 1:
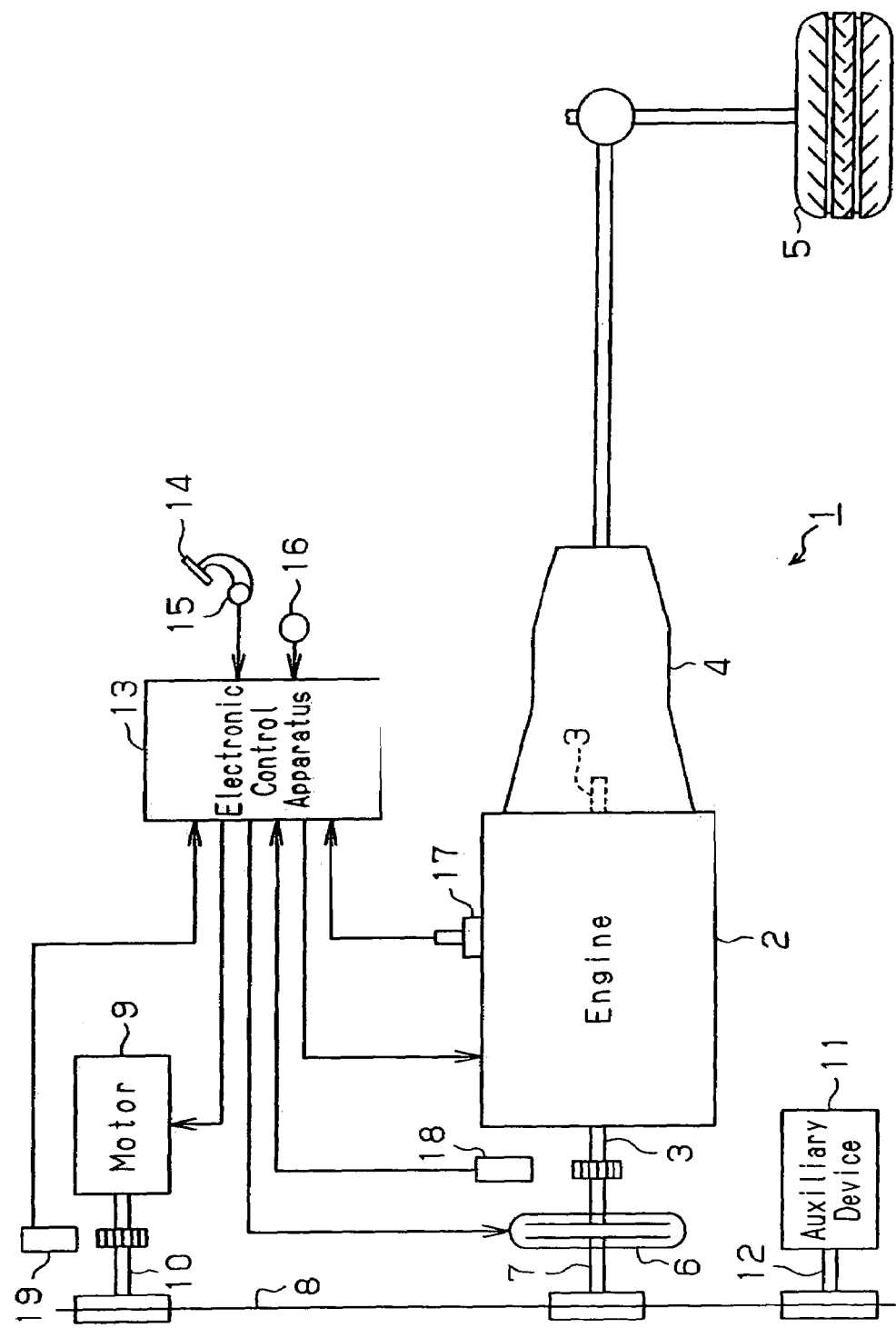
FIG. 1 shows the overall structure of a vehicle provided with an internal combustion engine to which the present invention is applied.

The automobile 1 shown in FIG. 1, which is provided with a multiple cylinder engine 2, moves by transmitting the rotation of a crankshaft 3 of an engine 2 to a wheel 5 through an automatic transmission gear 4. The crankshaft 3 of the engine 2 is connected to a connecting shaft 7 by means of a clutch 6, and the connecting shaft 7 is linked to an output shaft 10 of a motor 9 and an output shaft 12 of an auxiliary device 11 by a belt 8.

The auxiliary device 11 may be, for example, a water pump for circulating coolant for the engine 2, an air conditioner compressor used for air-conditioning the passenger compartment, an oil pump for circulating lubricating oil in the engine, and a power steering pump for driving the power steering device of the automobile 1.

The clutch 6 connects and disconnects the crankshaft 3 and the connecting shaft 7. When the clutch 6 is released, rotation cannot be transmitted between the crankshaft 3 and the connecting shaft 7, and when the clutch 6 is engaged, rotation can be transmitted between the crankshaft 3 and the connecting shaft 7. Accordingly, the motor 9 and the auxiliary device 11 may be connected to and disconnected from the engine 2 by controlling the clutch 6.

Furthermore, the automobile 1 is provided with an electronic control apparatus 13 for controlling the motor 9 and the clutch 6 as well as controlling the engine 2. The electronic control apparatus 13 receives detection signals from various sensors, such as a brake sensor 15 for detecting depression of a brake pedal 14 provided within the passenger compartment of the automobile 1, velocity sensor 16 for detecting the vehicle velocity of the automobile 1, coolant temperature sensor 17 for detecting the coolant temperature of the engine 2, engine rotation speed sensor 18 for outputting a signal corresponding to the rotation of the crankshaft 3 of the engine 2, and a motor rotation speed sensor 19 for outputting a signal corresponding to the rotation of the output shaft 10 of the motor 9.

When the engine 2 is stopped, the electronic control apparatus 13 initiates the starting of the engine 2 based on the engine start command. The engine start command is executed, for example, when the driver of the automobile 1 has operated an ignition switch (not shown). Furthermore, although the electronic control apparatus 13 automatically stops the engine 2 when engine operation is not required, such as when there is no possibility for the automobile 1 to move, the engine start command is issued when it becomes possible for the automobile 1 to move.

The possibility of the automobile 1 moving is determined based on detection signals from the brake sensor 15 and the velocity sensor 16. That is, when, for example, the vehicle velocity is substantially [0] and the brake pedal 14 is not depressed, it is determined that there is no possibility of the vehicle moving, and when the vehicle velocity is greater than or equal to a predetermined value or when the brake pedal 14 is not depressed, it is determined that there is a possibility of the vehicle moving.

Furthermore, since the engine 2 cannot drive the auxiliary device 11 when the engine 2 is being automatically stopped, the auxiliary device 11 is driven by the motor 9 when there is a demand for driving the auxiliary device 11. When the motor 9 drives the auxiliary device 11, the electronic control apparatus 13 controls the clutch 6 to initiate the release state to avoid needless transmission of the rotation of the motor 9 to the engine 2.

When starting the stopped engine 2, the crankshaft 3 is forcibly rotated (cranked) by actuating the motor 9 while the clutch 6 is in an engaged state. Then, the starting of the engine 2 is completed when the engine 2 shifts to independent operation subsequent to the cranking. The starting procedure of the engine 2 in the present embodiment will now be described.

In the present embodiment, when an engine start command is generated, the clutch is released, and the motor 9 is actuated in a state disconnected from the engine 2 immediately after the engine 2 is started. At this time, the rotational force of the motor 9 is accumulated as an inertial force in the direction of rotation, and when the clutch 6 is engaged and the cranking is initiated, the rotational force and inertial force of the motor 9 are both applied to the engine 2. Thereafter, when the motor 9 enters a predetermined rotation state, that is, when entering a rotation state in which the total amount of the two forces is a value enabling proper cranking for starting the engine 2, the clutch 6 is engaged and cranking of the engine 2 is initiated.

Such cranking is performed for proper engine starting by means of the combined rotational force and inertial force of the motor 9. The output torque of the motor 9 required at this time, that is, the output torque of the motor 9 required for proper cranking, is a low torque since the cranking is achieved not only by the rotational force of the motor 9 but also by the inertial force. Accordingly, the size of the motor 9 may be minimized while enabling proper cranking for engine starting.

Figure 2:
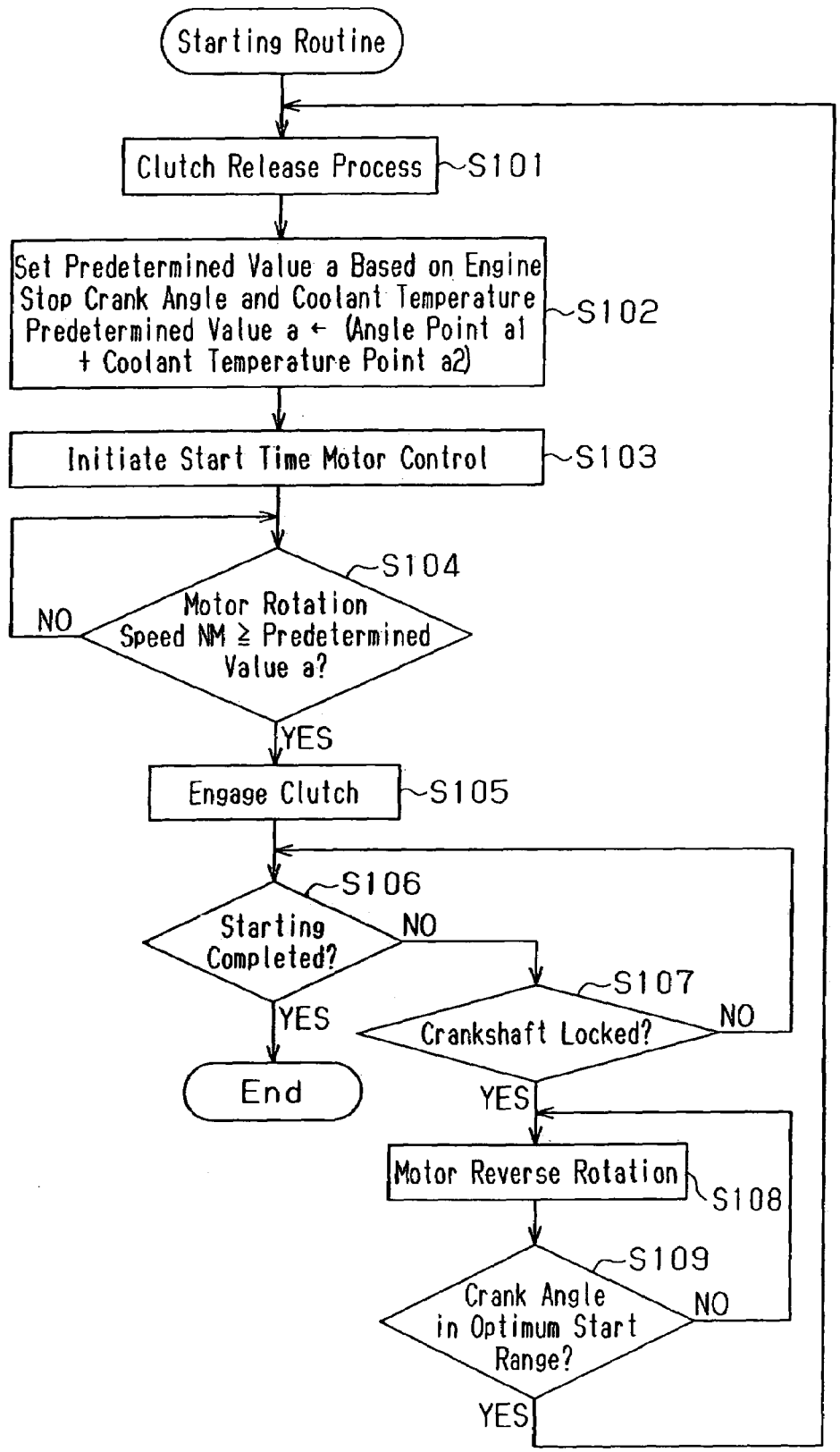
FIG. 2 is a flow chart showing the starting procedure of the engine in a first embodiment.

The starting procedure of the engine 2 will now be described in detail with reference to the flow chart of FIG. 2, which shows the starting routine. The starting routine, which is a program recorded on a computer-readable recording medium, is executed by the electronic control apparatus 13 when an engine start command is generated.

When the processes of the starting routine are executed, first, the clutch release process is performed (S101) That is, when the clutch 6 is to be released, the clutch 6 is released if the clutch 6 is in an engaged state, and if the clutch 6 is in a released state, this state is maintained. In this state, a predetermined value [a] relating to the motor rotation speed is set (S102), and motor control for engine starting is initiated (S103).

The motor control actuates the motor 9 so as to increase the motor rotation speed NM, which is obtained from the detection signal of the motor rotation speed sensor 19. Accordingly, if the motor 9 is stopped when the control is initiated, the motor rotation speed NM is gradually increased from [0] by controlling the actuation of the motor 9. If the motor 9 is operating the auxiliary device 11 when the control is initiated, the motor rotation speed NM is gradually increased from the value required to drive the auxiliary device 11 by controlling the actuation of the motor 9. When the motor control is performed in this manner, the rotational force of the motor 9 accumulates as an inertial force in the direction of rotation.

Then, a determination is made as to whether or not the motor 9 has entered the minimum rotation state required to perform proper cranking for engine starting based on whether or not the motor rotation speed NM is equal to or greater than a predetermined value [a] (determination value) (S104). When the determination result is affirmative, the clutch 6 is engaged (S105). This transmits the rotation of the motor 9 to the engine 2 and initiates cranking of the engine 2.

In this manner, the cranking of the engine 2 is performed after the motor 9 enters the minimum rotation state required to perform proper cranking for starting the engine. That is, although the cranking of the engine 2 is achieved by the combined rotational force and inertial force of the motor 9, the cranking starts after the total amount of the two forces reaches the minimum value required to perform proper cranking for starting the engine.

The determination as to whether or not the motor 9 has entered the minimum rotation state required to start the engine is made using the predetermined value [a] (determination value) set in the previously mentioned step S102. The setting of the predetermined value [a] (determination value) set in step S102 will now be described with reference to FIGS. 3 and 4.

In the process of step S102, the predetermined value [a] is set based on the engine state, such as the crank angle and coolant temperature when the engine 2 is in the stopped state. That is, the value obtained by adding an angle point [a1], which is calculated based on the crank angle in an engine stop state, and the coolant temperature point [a2], which is calculated based on the coolant temperature, is set as the predetermined value [a].

The engine stop crank angle is determined, for example, from the detection value of the engine rotation speed sensor 18 during a period lasting from when the engine 2 rotates at a predetermined speed until it stops, and the engine stop crank angle is stored in a backup RAM of the electronic control apparatus 13. Then, the engine stop crank angle stored in the backup RAM is used in step S102. Furthermore, the coolant temperature used in step S102 is determined based on the detection signal from the coolant temperature sensor 17.

Figure 3:
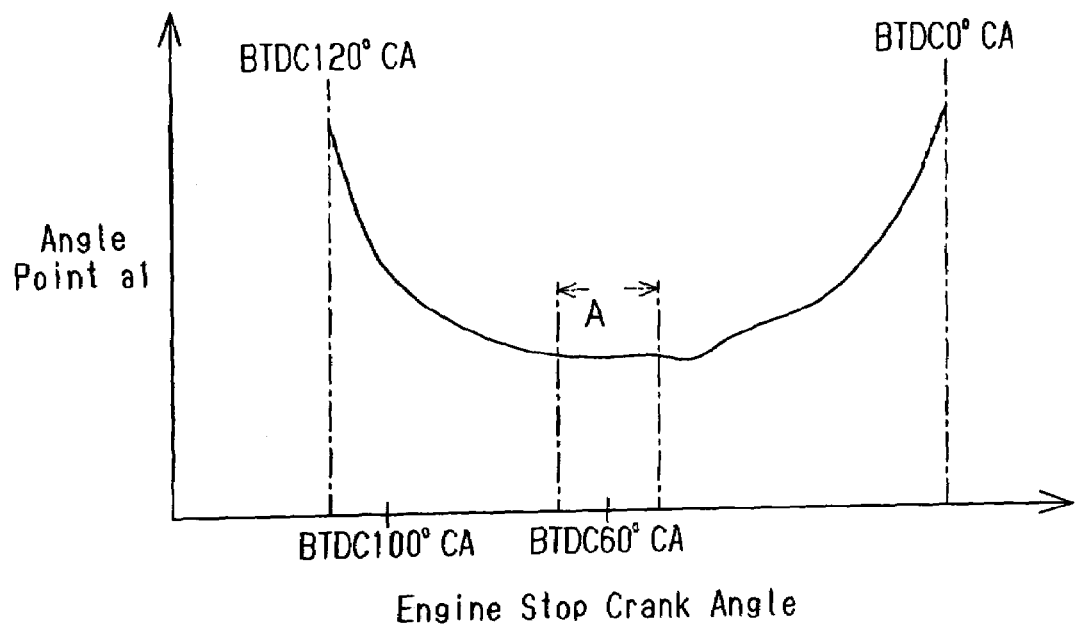
FIG. 3 is a graph showing the transition of the angle point [a1] relative to the change in engine stop crank angle.

The angle point [a1] calculated from the engine stop crank angle varies relative to the change in the engine stop crank angle as shown in FIG. 3. That is, in the cylinder corresponding to the compression stroke among the plurality of cylinders in the stopped engine, the angle point [a1] is at a maximum when the engine stop crank angle is equal to the compression stroke initiation crank angle (e.g., BTDC 120° CA) and to the compression top dead center (BTDC 0° CA) Since the pressure inside the compression stroke cylinder increases and resists cranking by the motor 9 when the engine stop crank angle is equal to the compression stroke initiation crank angle or the compression top dead center crank angle, the rotation speed of the motor 9 is increased to initiate proper cranking for starting the engine.

Furthermore, the angle point [a1] is at a minimum when the engine stop crank angle is in range A, which includes an angle that is in the middle of the compression stroke initiation crank angle and the compression top dead center crank angle (in this case, BTDC 60° CA). When the engine stop crank angle is in range A, the pressure rise within the compression stroke cylinder is relatively small while the motor 9 is performing cranking and there is not much cranking resistance. Thus, to perform proper cranking for engine starting, the rotation speed of the motor 9 prior to the initiation of cranking may be relatively low.

The angle point [a1] is gradually reduced from a maximum value to a minimum value when the engine stop crank angle shifts from the compression stroke initiation crank angle to range A, and when the engine stop crank angle shifts from the compression top dead center crank angle to range A.

Figure 4:
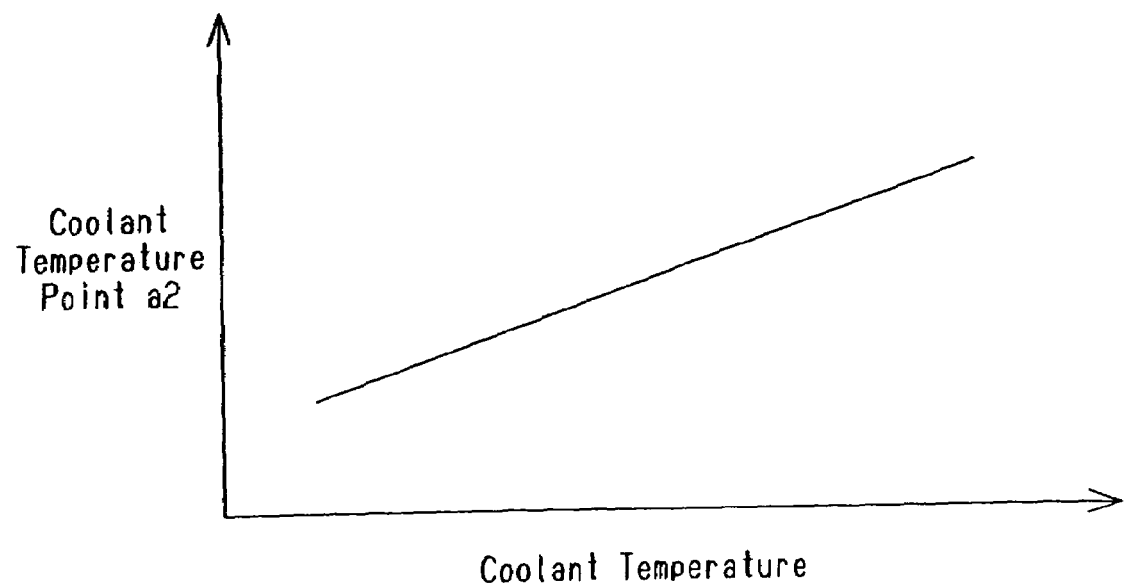
FIG. 4 is a graph showing the transition of the coolant temperature point [a2] relative to the change in coolant temperature.

The coolant temperature point [a2], which is calculated from the coolant temperature, increases as the coolant temperature increases as shown in FIG. 4. This is due to the following reasons. When cranking by the motor 9 compresses the gas in the compression stroke cylinder, the higher the coolant temperature of the stopped engine 2, that is, the higher the engine temperature (cylinder bore temperature), the smaller the percentage of the energy performing this work escapes from the cylinder bore as heat. As a result, the cranking resistance tends to increase as an adiabatic compression state is approached. In consideration of this fact, the rotation speed of the motor 9 is increased before initiating cranking to perform proper cranking for engine starting.

Therefore, by setting the predetermined value [a] based on the angle point [a1] and the coolant temperature point [a2] calculated in the manner described above, when the motor rotation speed NM reaches the predetermined value [a] (determination value), the motor 9 enters the minimum rotation state required to enable proper cranking for engine starting. If cranking is performed when the clutch 6 is engaged, the crankshaft 3 appropriately passes by the initial crank angle (BTDC 0° CA) at the first compression top dead center at which the rotational resistance is maximum.

In the starting routine, after the clutch 6 has been engaged in step S105, it is determined whether or not the starting of the engine 2 is completed (S106). This determination is performed, for example, based on whether or not the engine rotation speed determined, which is obtained from the detection signal of the engine rotation speed sensor 18, has reached a preset idle rotation speed. If it is determined that the engine rotation speed has reached the idle rotation speed and the starting of the engine 2 has been completed in the process of step S106, the starting routine ends.

When it is determined that the engine rotation speed has not reached the idle rotation speed and that the starting of the engine 2 has not been completed in the process of step S106, a determination is made as to whether or not the crankshaft 3 is locked (rotation stopped) from, for example, whether or not the engine rotation speed is [0] (S107). When the engine rotation speed is not [0] and the determination is that the crankshaft 3 is not locked (NO), the process returns to step S106. When the engine rotation speed is [0] and the determination is that the crankshaft 3 is locked (YES), the motor 9 is rotated in reverse (S108).

The reverse rotation of the motor 9 continues until the crank angle enters the optimum range for starting the engine 2, for example, until the crank angle enters a predetermined range (e.g., BTDC 100° CA to 60° CA) closer to the compression stroke initiation crank angle (BTDC 120° CA) than range A (FIG. 3) of the compression stroke cylinder. That is, a determination is made as to whether or not the crank angle is within the optimum starting range (S109), and the process of step S108 is repeated until the determination is affirmative. When the determination is affirmative in step S109, the reverse rotation of the motor 9 is stopped, and the process returns to step S101.

Accordingly, when the processes of steps S101 to S105 are initially executed subsequent to an engine start command is generated and the engine starting is performed for the first time but the engine 2 does not start and the crankshaft 3 is locked, the crank angle is moved into the optimum starting range by reverse rotation of the motor 9, and the engine 2 is restarted by executing the processes of steps S101 through S105 again.

The optimum starting range of the crank angle before the restarting is the predetermined range (BTDC 100° CA to 60° CA) that is close to the compression stroke initiation crank angle (BTDC 120° CA). This is because it is preferable that the force for shifting the crank angle to the compression top dead center crank angle (BTDC 0° CA) generated by the motor 9 during the restarting is greater than that during the initial engine starting.

The present embodiment described above has the advantages described below.

(1) When initiating engine starting, the clutch 6 is released and the motor 9 is actuated, and after the motor 9 enters the minimum rotation state required to perform proper cranking for engine starting, the clutch 6 is engaged to initiate the cranking of the engine 2. The cranking properly starts the engine by combining the rotational force and inertial force of the motor 9. The output torque of the motor 9 required at this time is a low torque since cranking is accomplished not just by the rotational force, but also by the inertial force of the motor 9. Therefore, the size of the motor 9 is minimized while proper cranking for engine starting is performed.

(2) When the clutch 6 is released, the minimum rotation state of the motor 9 required to perform proper cranking for engine starting differs in accordance with the present engine state, such as the crank angle and coolant temperature (during engine stop). However, the predetermined value [a] (determination value), which is used when determining whether or not the motor 9 has attained a rotation state capable of cranking suitable for starting the engine, is set based on the angle point [a1] and the coolant temperature point [a2], which are calculated according to the engine state. This means that the control of the motor 9 changes in conjunction with the engine state when the motor rotation speed NM increases to the predetermined value [a]. Thus, when the motor rotation speed NM reaches the predetermined value [a], the rotation state of the motor 9 is in the minimum rotation state required to properly perform cranking for engine starting regardless of the state of the engine. Accordingly, the motor 9 is prevented from continuing useless operation with the clutch 6 in a released state.

(3) When the engine 2 is not completely started by the initial engine starting, the engine 2 can be reliably restarted because restarting of the engine 2 is performed.

(4) When engine starting is initially performed, if the crankshaft 3 becomes locked and starting cannot be completed, restarting of the engine is executed smoothly because the motor 9 is rotated in reverse so as to reversely rotate and unlock the crankshaft 3 before restarting the engine 2.

(5) The reverse rotation of the motor 9 is performed so that the crank angle enters the optimum starting range. Since the restarting of the engine 2 is initiated when the motor 9 is in this state, the possibility for completing the starting of the engine 2 is increased.

(Second Embodiment)

A second embodiment of the present invention will now be described with reference to FIGS. 5 through 7.

In this embodiment, during engine starting, the clutch 6 is switched from a released state to an engaged state after a predetermined time elapses from when the motor control for engine starting is initiated rather than when the motor rotation speed NM reaches the predetermined value [a] as in the first embodiment.

Figure 5:
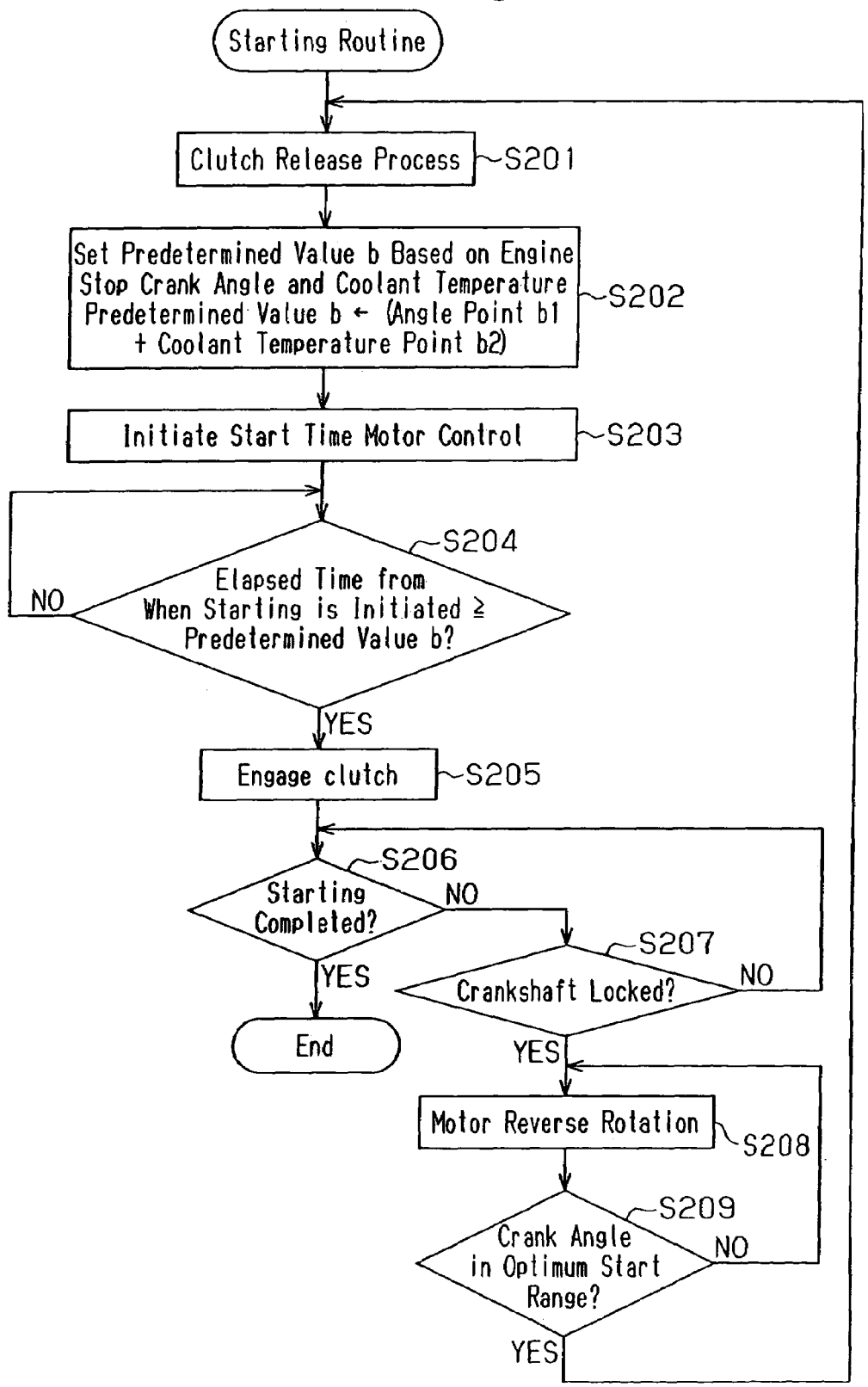
FIG. 5 is a flow chart showing the starting procedure of the engine in a second embodiment.

FIG. 5 shows the starting routine of the present embodiment. The routine differs from the starting routine of the first embodiment only in the processes corresponding to steps S102 and S104 (S202 and S204).

A clutch release process (S201), setting of a predetermined value [b] related to the start control elapsed time (S202), and a start time motor control (S203) are sequentially executed. Then, a determination is made as to whether or not the elapsed time from the beginning of the start time motor control step is equal to or greater than the predetermined value [b] (S204) as processes of the start routine of FIG. 5. The process of step S204 determines whether or not the motor 9 has entered the rotation state enabling proper cranking for engine starting.

That is, the rotation state of the motor 9 changes in accordance with the length of time elapsed from when the motor control step is initiated since the start time motor control causes the rotation state to approach the state in which proper cranking is performed for engine starting. Accordingly, the rotation state of the motor 9 may be assumed based on the time elapsed from when the start time motor control step is initiated, and it can be determined whether or not the motor 9 has reached the minimum rotation state required to perform proper cranking for engine starting based on whether or not the elapsed time is equal to or greater than the predetermined value [b] (determination value).

The setting of the predetermined value [b] (determination value) in step S202 will now be described with reference to FIGS. 6 and 7.

In the process of step S202, the predetermined value [b] is set based on the engine conditions, such as the crank angle and coolant temperature when the engine 2 is stopped. More specifically, when the engine 2 is stopped, the angle point [b1], which is calculated from the engine stop crank angle, and the coolant temperature point [b2], which is calculated from the coolant temperature, are added to obtain the predetermined value [b].

Figure 6:
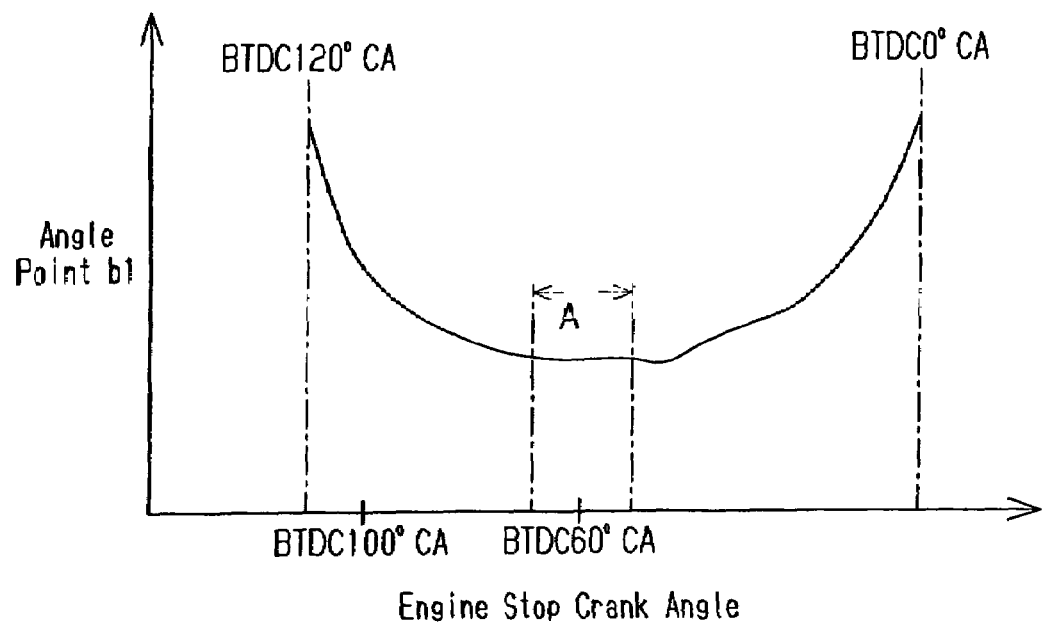
FIG. 6 is a graph showing the transition of the angle point [b1] relative to the engine stop crank angle.
Figure 7:
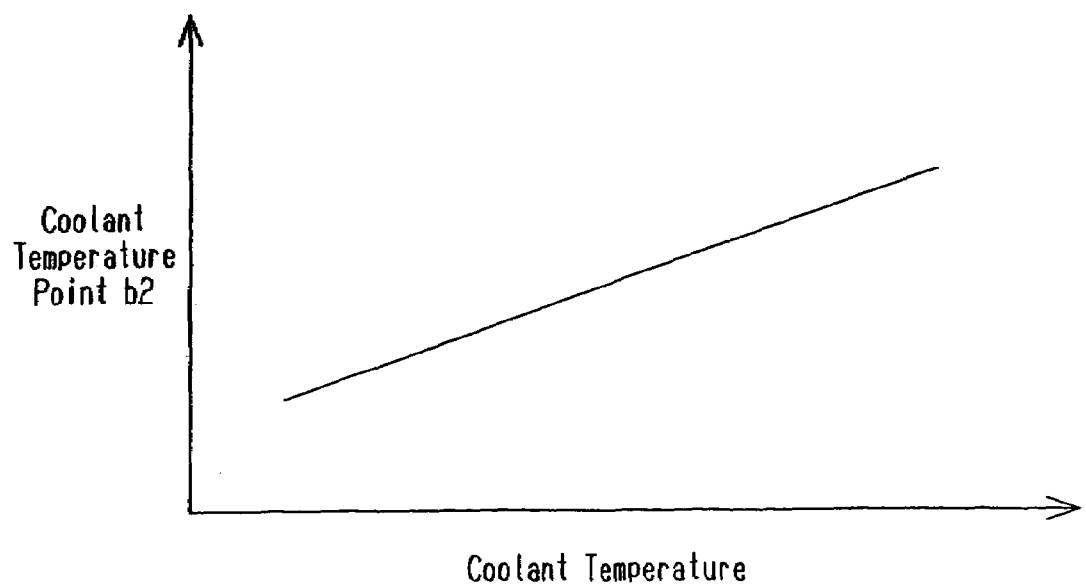
FIG. 7 is a graph showing the transition of the coolant temperature point [b2] relative to the change in the coolant temperature.

The angle point [b1], which is calculated from the engine stop crank angle when the engine is stopped, varies relative to the change in the engine stop crank angle, as shown in FIG. 6. Furthermore, the coolant temperature point [b2], which is calculated from the coolant temperature, changes relative to the change in the coolant temperature, as shown in FIG. 7.

As apparent from the drawing, the change in the angle point [b1] and the coolant temperature point [b2] relative to the change in the engine stop crank angle and coolant temperature is identical to the change in the angle point [a1] and the coolant temperature point [a2] relative to the change in the engine stop crank angle and coolant temperature in the first embodiment. The change in the angle point [b1] and the coolant temperature point [b2] occurs for the same reasons as the change in the angle point [a1] and the coolant temperature point [a2] in the first embodiment.

When the determination is affirmative in step S204 such that it is determined that the motor 9 has entered the minimum rotation state required to crank the engine, the clutch 6 is engaged (S205). This transmits the rotation of the motor 9 to the engine 2 and initiates the cranking of the engine 2. Thereafter, the processes of step S206 and the subsequent steps are executed.

A determination is made as to whether or not the starting of the engine 2 has been completed (S206). The determination continues under the condition that the crankshaft 3 is not locked (S207: NO). When it is determined that the starting of the engine 2 has been completed (S206: YES), the starting routine ends. If the crankshaft 3 is locked (S207: YES), the crankshaft 3 is rotated in reverse until the reverse rotation of the motor 9 causes the crank angle to enter the optimum starting range (S208, S209). Thereafter, the processes of step S201 and the subsequent steps are executed again, and the engine 2 is restarted.

In addition to advantages (1) through (5) of the first embodiment, the second embodiment has the following advantages.

(6) The predetermined value [b] is used when determining whether or not the motor 9, which is actuated while the clutch 6 is released, has reached the minimum rotation state required for proper cranking to start the engine. The predetermined value [b] (determination value) is set based on the angle point [b1] and coolant temperature point [b2] calculated in accordance with the engine state. This means that the control of the motor 9 changes in accordance with the engine state until the elapsed time from when the start time motor control is initiated to when the predetermined value [b] is achieved. In this way, when the predetermined value [b] is reached in the elapsed time, the rotation state of the motor 9 may be the minimum rotation state required to perform proper cranking for engine starting regardless of the engine state. Accordingly, the motor 9 is prevented from continuing useless operation when the clutch 6 is released.

The above embodiments may be modified, for example, as described below.

In the aforesaid embodiments, the reverse rotation of the motor 9 after the crankshaft 3 has locked during cranking does not necessarily have to be performed until the crank angle enters the optimum start range. For example, the reverse rotation of the motor 9 may be ended when the crank angle enters the optimum start range even if the crank angle does not enter the optimum starting range as long the crankshaft 3 is released from a locked state.

The reverse rotation of the motor 9 does not necessarily have to be performed.

Although the coolant temperature is used in setting the predetermined values [a] and [b] in the aforesaid embodiments, other parameters representing the engine state may also be used. The lubricating oil temperature and the block temperature of the engine 2 may be used as such a parameter. Furthermore, the engine temperature immediately before initiating the starting of the engine (cylinder bore temperature) may be assumed from the engine operating state prior to engine stopping (engine rotation speed, engine load and the like) or from the time elapsed from when the engine stopped, and these factors may be considered for use as parameters.

Although the determination as to whether or not the rotation state of the motor 9 when the clutch 6 is released has reached the state enabling proper cranking for engine starting is based on whether or not (i) the motor rotation speed NM has reached the predetermined value [a] in the first embodiment, and whether or not (ii) the elapsed time from when the start time motor control step is initiated has reached the predetermined value [b] in the second embodiment, the present invention is not limited to such arrangements. For example, the determination may be accomplished using both items (i) and (ii), such that when either item (i) or (ii) is determined to be affirmative, or when both are determined to be affirmative, the rotation state of the motor 9 may be deemed to have entered the state enabling proper cranking.

The predetermine values [a] and [b] do not have to be variable values that are based on the engine state when the engine is stopped and may be fixed values determined beforehand in a manner irrelative to the engine state when the engine is stopped.

The present invention may also be applied to automobiles that are driven by a motor instead of an engine. In this case, the use of the motor 9 in the aforesaid embodiments may be used to drive the automobile 1. In such a case, an increase in the number of parts used when the engine and motor are both used to drive the automobile 1 is avoided since the motor 9 is used in combination with the engine 2 to drive the automobile 1 and not just to start the engine 2.

What is claimed is:

1. A starting control apparatus for an internal combustion engine installed in a vehicle, the starting control apparatus comprising:
   a motor and a clutch with the clutch operable for connecting and disconnecting the motor and the internal combustion engine; and
   a control means for releasing the clutch and maintaining the motor in an actuated state when starting the internal combustion engine, setting a determination value based on a state of the engine, and engaging the clutch after a predetermined time from when an engine start command is issued is one of equal to and greater than the determination value.

2. The starting control apparatus for an internal combustion engine according to claim 1, wherein the motor is also used to move the vehicle.

3. The starting control apparatus for an internal combustion engine according to claim 1, wherein the control means changes control of the motor based on the state of the engine until the clutch is engaged.

4. The starting control apparatus for an internal combustion engine according to claim 3, wherein the control means determines whether or not the motor has entered the predetermined rotation state, and varies the determination value used in the determination based on the state of the engine.

5. The starting control apparatus for an internal combustion engine according to claim 3, wherein the control means determines whether or not the predetermined time has elapsed from when an engine start command is issued, and varies the determination value used in the determination based on the state of the engine.

6. The starting control apparatus for an internal combustion engine according to claim 1, wherein the control means determines whether or not the starting of the internal combustion is completed after the clutch is engaged, and restarts the engine when determining that starting has not been completed.

7. The starting control apparatus for an internal combustion engine according to claim 6, wherein when determining that the starting of the engine has not been completed during initial engine starting, the control means restarts the engine through the same procedure as that in the initial engine starting after the clutch is released.

8. The starting control apparatus for an internal combustion engine according to claim 6, wherein the control means releases the clutch after reversely rotating the internal combustion engine a predetermined amount with the motor after determining that the starting of the engine has not been completed in the initial engine starting.

9. The starting control apparatus for an internal combustion engine according to claim 8, wherein the control means reversely rotates the internal combustion engine with the motor to a state for properly starting the engine.

10. The starting control apparatus for an internal combustion engine according to claim 1, wherein when starting the internal combustion engine, the control means starts actuation of the motor after releasing the clutch, and then engages the clutch.

11. A method for controlling starting of an internal combustion engine provided with a clutch for connecting and disconnecting a motor and the internal combustion engine, which is installed in a vehicle, the method for controlling starting of an internal combustion, comprising:
    releasing the clutch and maintaining the motor in an actuated state when starting the internal combustion engine;
    setting a determination value based on a state of the engine; and
    engaging the clutch after a predetermined time from when an engine start command is issued is one of equal to and greater than the determination value.

12. The method for controlling starting of an internal combustion engine according to claim 11, further including:
    changing control of the motor based on the state of the engine until the clutch is engaged.

13. The method for controlling starting of an internal combustion engine according to claim 12, further including:

determining whether or not the motor has entered the predetermined rotation state, and varying the determination value used in the determination based on the state of the engine.

14. The method for controlling starting of an internal combustion engine according to claim 12, further including:
determining whether or not the predetermined time has elapsed from when an engine start command was issued, and varying the determination value used in the determination based on the state of the engine.

15. The method for controlling starting of an internal combustion engine according to claim 11, further including:
determining whether or not the starting of the internal combustion engine has been completed after the clutch is engaged, wherein when determining that the starting has not been completed, the engine is restarted.

16. The method for controlling starting of an internal combustion engine according to claim 15, wherein when determining that the starting of the engine has not been completed during initial engine starting, the engine is restarted through the same procedure as that in the initial engine starting after the clutch is released.

17. The method for controlling starting of an internal combustion engine according to claim 15, wherein the clutch is released after reversely rotating the internal combustion engine a predetermined amount with the motor when determining that the starting of the engine has not been completed during the initial starting of the engine.

18. The method for controlling starting of an internal combustion engine according to claim 17, wherein the internal combustion engine is reversely rotated with the motor to a state for properly starting the engine.

19. The method for controlling starting of an internal combustion engine according to claim 11, wherein when starting the internal combustion engine, actuation of the motor is initiated after the clutch is released, and then the clutch is engaged.

20. A computer readable recording medium on which a program is recorded for controlling starting of an internal combustion engine provided with a clutch for connecting and disconnecting a motor and the internal combustion engine, which is installed in a vehicle, the program when executed by an electronic control apparatus for the vehicle, comprising:
releasing the clutch and maintaining the motor in an actuated state when starting the internal combustion engine;
setting a determination value based on a state of the engine; and
engaging the clutch after a predetermined time from when an engine start command is issued is one of equal to and greater than the determination value.

21. The recording medium according to claim 20, wherein the program when executed by the electronic control apparatus further includes changing the control of the motor based on the state of the engine until the clutch is engaged.

22. The recording medium according to claim 21, wherein the program when executed by the electronic control apparatus further includes determining whether or not the motor has reached the predetermined rotation state, and varying the determination value used in the determination based on the state of the engine.

23. The recording medium according to claim 21, wherein the program when executed by the electronic control apparatus further includes determining whether or not the predetermined time has elapsed from when an engine start command is issued, and varying the determination value used in the determination based on the state of the engine.

24. The recording medium according to claim 20, wherein the program when executed by the electronic control apparatus further includes determining whether or not the starting of the internal combustion has been completed after the clutch has engaged, wherein when determining that the starting has not been completed, the engine is restarted.

25. The recording medium according to claim 24, wherein when determining that the starting of the engine has not been completed during initial engine starting, the program restarts the engine through the same procedure as that in the initial engine starting after the clutch is released.

26. The recording medium according to claim 24, wherein the program releases the clutch after reversely rotating the internal combustion engine a predetermined amount with the motor when determining that the starting of the engine has not been completed during the initial starting of the engine.

27. The recording medium according to claim 26, wherein the program reversely rotates the internal combustion engine with the motor to a state for properly starting the engine.

28. The recording medium according to claim 20, wherein when starting the internal combustion engine, the program starts actuation of the motor after the clutch has been released, and then engages the clutch.

* * * * *